UNITED STATES PATENT OFFICE.

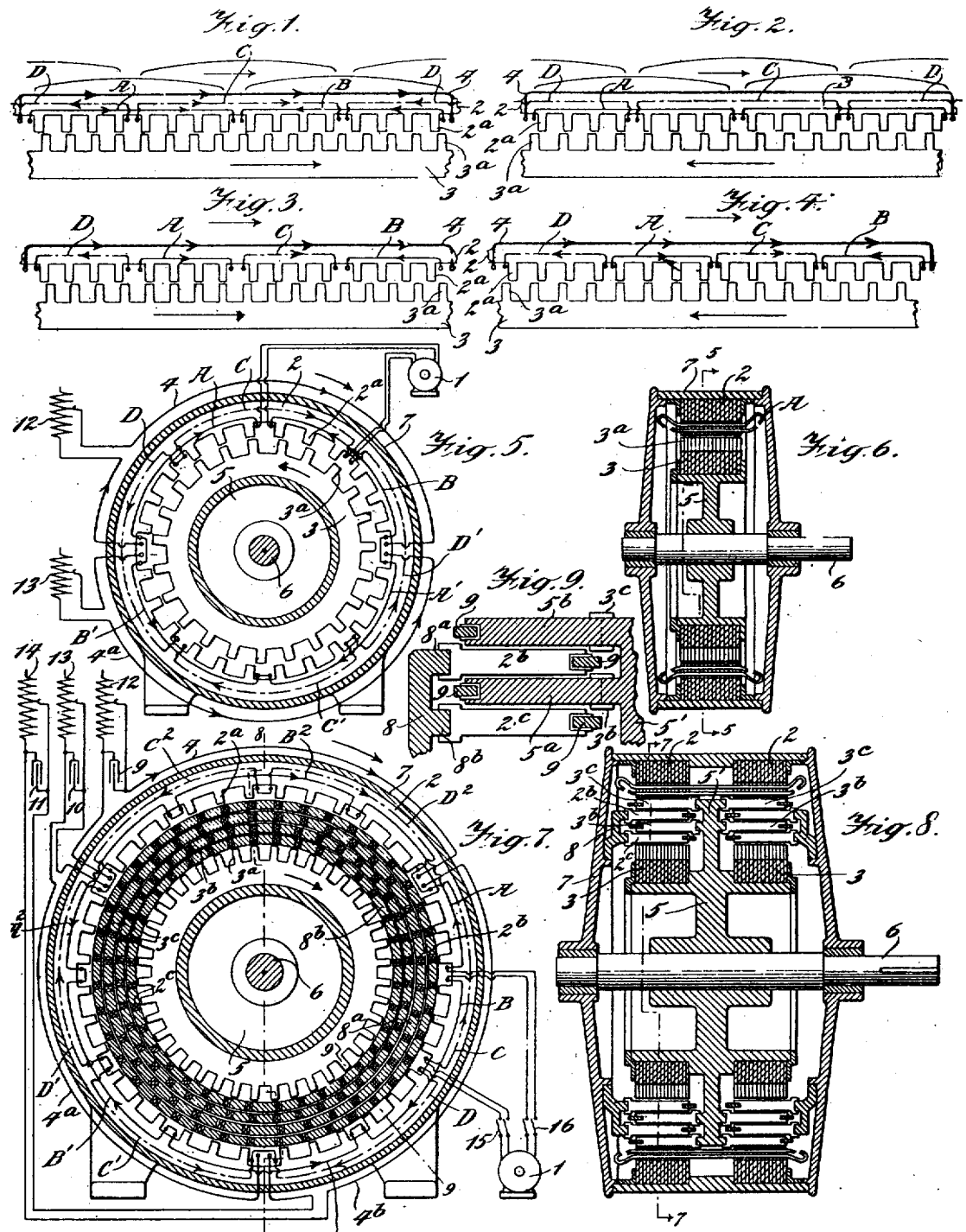

ALFONS H. NEULAND, OF NEW YORK, N. Y.

INDUCTION DEVICE.

1,237,944.     Specification of Letters Patent.     Patented Aug. 21, 1917.

Application filed September 1, 1915. Serial No. 48,466.

*To all whom it may concern:*

Be it known that I, ALFONS H. NEULAND, a subject of the Czar of Russia, residing at the city of New York, in the borough of Manhattan and State of New York, have invented certain new and useful Improvements in Induction Devices, of which the following is a full, clear, and exact description.

My invention relates to electro-magnetic or induction devices and embodiments of my invention are adapted to be operated as induction motors, as induction generators, and as frequency converters.

An object of my invention is to produce such a device the electrical synchronous speed of which for any given frequency is independent of the number of primary or secondary poles.

Another object is to produce an induction machine in which the rotor, when in electrical synchronism with the revolving field, has a lower angular velocity than the field.

Another object is to provide such a machine which will permit both the primary and secondary windings to be carried on the same member.

Other objects are an increase in power and efficiency, simplicity and compactness of construction, and reliability in operation. Still other objects and advantages of my invention will appear from the following description.

In accordance with my invention I cause a revolving magnetic field to act and produce a torque on the rotor through an air gap of varying reluctance, causing the rotor, when in electrical synchronism with the field, to rotate at a lower angular velocity than that of the field.

My invention comprehends a rotor which has a plurality of spaced magnetic conductors coöperative with spaced magnetic conductors on the stator arranged in close relation therewith, and forming one or more sections in each of which the conductors are alined in one portion and staggered or fully offset in another portion, while in other portions they are partially alined, being partially offset in one direction on one side of the fully alined portion and partially offset in the opposite direction on the other side of the fully alined portion. The two members are traversed by a revolving magnetic field in which the poles of opposite polarity are spaced apart substantially the distance between the alined and fully offset portions, and an induced circuit is provided which surrounds the section and in which a current is induced as the field progresses from one portion to another.

The driven element develops a torque by reason of the induced current in the winding produced by the progression of the field, which current coöperates with the field so as to strengthen the flux at one partly alined portion and weaken it at the other partly alined portion at the moment when the revolving field poles oppose the partly alined portions, thus forcing the magnetic conductors at the strengthened portion to aline themselves without being opposed from so doing by the other partly alined portion due to the weakened condition of the flux at the latter portion.

My invention also comprehends means for varying the resistance of the induced circuit.

My invention also comprehends means for supplying a leading magnetizing current to the secondary or induced circuit, which in the preferred form is done by means of a condenser in the induced circuit.

My invention also comprehends various other features of construction and combinations of parts as will hereinafter more fully appear. I shall now describe the embodiments of my invention illustrated in the accompanying drawings and shall thereafter point out my invention in claims.

Figures 1 to 4, inclusive, are developments of the stator and rotor of four modified embodiments of my invention, together with the windings thereon;

Fig. 5 is a transverse section of an embodiment of my invention taken on the line 5—5 of Fig. 6. and showing the primary circuit and the secondary or induced circuits in diagram;

Fig. 6 is a longitudinal central section of the same;

Fig. 7 is a view similar to Fig. 5 and taken on the line 7—7 of Fig. 8, showing another modified embodiment of my invention;

Fig. 8 is a longitudinal section of the same taken on the broken line 8—8 of Fig. 7;

Fig. 9 is a sectional detail of the coöperating magnetic conductors of the stationary and rotatable members, taken on the line 9—9 of Fig. 7.

The machine comprises two principal elements, a stator having the windings thereon, and the rotor.

A linear representation of the two elements is shown in Fig. 1. In the construction shown, the revolving field is obtained by a polyphase current. The primary or magnetizing winding A, B, C, D, which is fed by a polyphase generator 1 (see Fig. 5), is mounted upon the stator 2, which is an annular laminated member provided on its inner periphery with a plurality of spaced flux conductors or teeth $2^a$. The primary winding is shown as a two phase winding.

The rotor 3 is a laminated member coöperating with the stator to complete paths for the flux, and having on its outer periphery adjacent the stator a plurality of spaced magnetic flux conductors or teeth $3^a$. The relation of the stationary to the rotatable flux conductors is such that the two series of conductors are alined at one point and staggered or fully offset at another point and are partly alined at intermediate points; or in other words, the flux conductors of the two members coöperate to form one or more sections having successive portions in which the conductors of the two members are respectively offset in one direction, alined, offset in the opposite direction, and fully offset.

In the construction shown in Fig. 1, this relation results from the fact that while the flux conductors of both the stator and rotor are evenly spaced, they have a different pitch. As shown in this construction, the section illustrated contains sixteen equally spaced stationary flux conductors $2^a$, and seventeen equally spaced rotatable conductors $3^a$, and it is evident that in such a construction, the rotation of the rotatable teeth with respect to the stationary teeth for a distance equal to the pitch of the rotatable teeth will cause a progression of the point of alinement throughout the length of the entire section; or in other words, the ratio of movement between the rotatable members and the flux path formed at the point of alinement is 1 to 17.

The primary winding is arranged upon the stator in the usual way to produce a progression of the magnetic field, and each phase is wound to form two poles of opposite polarity in each section. While for the sake of clearness only one turn is shown for each pole, in practice a distributed winding would be employed, obtaining a maximum flux at the centers of the coils and a zero flux at the ends of the coils. One phase winding shown in full lines comprises the two oppositely wound coils A and B, each coil spanning the distance of two portions or half the section, and the other phase shown in the dash and dot lines, is similarly arranged to form the two pole windings or coils C and D, the two phases being displaced 90 electrical space degrees. It will be observed that in this way the two poles of the progressive field are spaced apart the distance between the alined and fully offset portions, and therefore when one pole opposes the alined portion the other opposes the staggered portion.

A secondary or induced winding 4 is provided upon the stationary member which spans approximately the distance of twice the pole pitch; or in other words, surrounds the section which contains the four portions.

As long as the rotor, that is, the rotatable series of teeth $3^a$, is stationary, a progression of the field will alternately bring the north and south poles opposite the alined portion, thus causing the flux to alternate through the coil 4 and generate a current therein, the frequency of which is determined by the speed of the field. If the series of rotatable teeth $3^a$ were rotated in such a way that the point of alinement were made to rotate in the same direction as the field, the frequency of the generated current in the coil 4 would be decreased and would be zero if the velocity of the progressing alined path were equal to the speed of the field. If on the other hand, the point of alinement were made to rotate in opposition to the field, the frequency would thereby be increased and would be equal to the sum of the frequencies of the revolving field and alined portion.

The driven rotatable member and the driving field member are in electrical synchronism when the flux path or alined portion rotates in the same direction and at equal speed with the field, and as above pointed out, due to the relation between the stationary and rotatable flux conductors, the angular velocity of the alined path exceeds that of the rotor and the revolving field is in electrical synchronism with the rotor when the latter rotates at a much lower speed than the field.

A torque is developed in the rotor by reason of the current which is induced in the winding 4 by the progression of the field, and this induced current in turn coöperates with the primary field and strengthens the flux at one portion in which the conductors are partly alined and weakens the flux at the other portion in which the conductors are also partly alined but offset in the opposite direction.

With the members in the position shown in Fig. 1, assume that the current in the coils A B is at its maximum value in the direction indicated by the arrows, then the current in the coils C D is zero, and we will denominate the flux of the coil A at this instant an N flux, and that of the coil B an S flux. Means which are not shown in Fig. 1, are provided for completing separate paths for the two fluxes, so that the quantity of the flux is chiefly determined by the reluctance of the two variable air gaps, and the difference in the two fluxes is therefore enabled to complete its circuit when the flux in one pole is at its maximum and the other at its minimum, or when one flux is greater than the other. Since the N pole opposes the alined portion and the S pole opposes the staggered portion, the secondary coil 4 surrounding both poles is traversed by an N magnetic flux. As the current in the coils A B falls to zero that in the coils C D rises to its maximum value in the direction indicated by the arrows. In other words, the field progresses in a clockwise direction and the N pole moves from the alined portion to that portion of partial alinement in which the rotatable conductors are offset to the left, while the S pole moves from the staggered portion to that portion in which the rotatable conductors are offset to the right. At this instant the north flux through the secondary coil is equal to the south flux and hence the active flux through the coil is zero. The change from the north flux to a zero flux through the secondary coil during such progression of the field induces a current in the coil which has the same direction as the primary magnetizing current of the north pole, and therefore creates a field in the area surrounded by the coil 4, which is of the same direction as that of the north pole, and therefore this created north field combines with the field of the north pole under the partly alined portion at the right of the alined portion, and causes the rotor to progress in a clockwise direction.

The created north field, however, opposes the field of the south pole under the portion at the right of the staggered portion and reduces or eliminates the counter pull which would otherwise exist at this point and would tend to cause rotation in the opposite direction. In this way the induced or secondary current coöperates with the revolving field and forces the magnetic conductors at the strengthened portion to aline themselves without any opposition from the other partly alined portion.

It will be observed that if the field were to revolve in a counter-clockwise direction, the N pole would then pass the partly alined portion at the left of the alined portion, the induced current in the coil 4 would have the same direction as before, since it would be a decreasing N flux which generated it, and this induced current would, as before, established a north field coöperating with the N pole at the left and opposing the S pole at the right, thus causing the flux conductors of the portion at the left of the alined portion to aline, resulting in rotation in a counter-clockwise direction.

The direction of rotation of the rotor relative to that of the field is determined solely by the arrangement of the flux conductors. In Fig. 2 is shown an arrangement for rotation of the rotor in opposition to the field. In this construction the stationary flux conductors 2ª exceed in number the rotatable flux conductors 3ª, there being sixteen stationary flux conductors 2ª, and fifteen rotatable flux conductors 3ª, and hence the rotatable flux conductors 3ª in the partially alined portions of Fig. 2 are partially offset in the reverse direction to that of the corresponding flux conductors in Fig. 1. Consequently, the rotation of the field in Fig. 2 in a clockwise direction will cause the rotor to rotate in a counter-clockwise direction and vice-versa.

In Figs. 3 and 4 are shown constructions in which the stationary flux conductors are arranged in groups of four each, each group forming a portion and the coils A and B of one phase of the primary winding surrounding alternate portions and the coils C and D of the other phase surrounding the intermediate portions. In Fig. 3 the spacing of the stationary and rotatable flux conductors is substantially the same as in Fig. 1, and therefore the rotor will rotate with the field, while in Fig. 4 the spacing is substantially the same as in Fig. 2, and hence the rotor will rotate against the field. The relative direction of rotation of the field and rotor is indicated in each instance by arrows.

While in the illustrated constructions the secondary winding 4 is shown on the stator, it may be arranged on the rotor, the only requirement being that it encircle one section of twice the pole pitch. The apparatus therefore requires at least one section having portions in which the flux conductors are successively alined, partially offset in one direction, fully offset or staggered and partially offset in the opposite direction; it also requires a secondary winding properly surrounding the section and carried by one of the elements, and a field properly acting on the section and the winding.

It has been pointed out heretofore that a separate flux path is provided for the N flux and the S flux so that they are not interfered with when they are at their maximum. In Figs. 5 and 6 such an arrangement is shown. The machine illustrated in these figures includes two pairs of poles, the two N poles being disposed 180 degrees apart and the two S poles also being disposed 180 degrees apart and intermediate the N poles. The pole windings A and A' of the one phase of the primary winding are wound in the same direction and opposite to the intermediate coils B and B', and similarly the coils C and C' of the other phase are wound oppositely to the intermediate coils D and D'. The laminated rotor 3 is mounted upon a drum or core 5 which is secured upon the rotor shaft 6.

The stationary flux conductors are arranged in two sections displaced with respect to one another the distance of half a tooth pitch. Since the induced currents are not in the same direction in the two sections, due to this displacement, separate induced windings 4 and 4ª are provided for the two sections. The total area of alinement opposing the similar poles remains substantially constant, irrespective of the position of the rotor, due to the displacement of one section relative to the other.

The laminated stationary member 2 is annular in shape and is carried on the inner periphery of the cylindrical portion of the frame or casing 7 of the machine.

Since the poles of opposite polarity are spaced apart the distance between the alined and staggered portions in each section, it is manifest that, due to the offsetting of the two sections one-half a tooth pitch, when the north pole is opposing the alined portion in one section, the south pole will oppose the alined portion in the other section. This is illustrated in Fig. 5, and the separate flux path for the flux of one section includes the path of alinement in the other section, and at all positions of the driving and driven members the path of the active flux in each section includes the pole of opposite polarity in the other section.

In the constructions shown in Figs. 1 to 6, inclusive, a torque impulse is produced each time that a pole passes a partly alined portion, at which moment the induced current, as well as the torque on the rotor, is at a maximum; and when the poles pass the alined or staggered sections, the induced current is zero and no torque exists. Therefore, as the field system rotates an intermittent torque is developed by the rotor.

In Figs. 7 and 8, a construction is illustrated which is capable of producing practically a continuous torque. This construction has three circumferential sections which are displaced one-third of a tooth pitch against one another, and the field has three pole pairs and a three-phase induced winding consisting of the phases 4, 4ª and 4ᵇ.

The currents in the induced windings therefore reach their maximum values 120 electrical time degrees one after the other, thus causing the maximum torque impulses to succeed one another 120 electrical time degrees apart and therefore to merge into a continuous torque.

In this construction, as in the others, each of the secondary windings encircles a north and south pole, the winding 4 encircling the coils C² and D², the winding 4ª encircling the coils C' and D', and the winding 4ᵇ encircling the coils C and D. The direction of the flux through each winding depends, of course, on the direction of the primary magnetizing current. If a north pole opposes the alined portion and a south pole opposes the staggered portion, the flux through the winding will be principally a north flux. However, a portion of the south flux will pass through the coil at the staggered portion and obviously subtract from the active value of the north flux, thus decreasing the generated electromotive force since the difference is the active flux which generates the electromotive force.

In Figs. 7 and 8, means are shown for increasing the effectiveness of the power apparatus by enabling an increase in the primary field ampere turns without changing the active or generating flux. In this construction, a plurality of series of rotatable and stationary flux conductors are employed, the alternate series being stationary and the intermediate series being rotatable, and the conductors of the respective series being radially alined.

In this way the total air gap at the non-alined portions is greatly increased relative to that at the alined portions, enabling a proportionately greater field strength as well as induced current.

As shown, two concentric series of stationary laminated bars 2ᵇ and 2ᶜ are supported upon a stationary bracket 8 carried by the casing 7. To carry and space the bars 2ᵇ and 2ᶜ, the bracket 8 is of non-magnetic material and has two integral concentric ring portions 8ª and 8ᵇ spaced apart and disposed in the annular space between the inner ends of the teeth 2ª and the outer ends of the teeth 3ª. Each of the rings 8ª and 8ᵇ is provided with a series of radial longitudinal slots for the reception of the laminated bars 2ᵇ and 2ᶜ, respectively, the bars having a bifurcated inner end which fits over the ring at the end of the slot, thereby holding the inner ends of the bars against escaping radially from the slot; and the outer edge of the ring being provided with a circumferential groove and the outer ends of the bars being correspondingly slotted so as to form a continuous groove when the bars are in place. A ring 9 of preferably non-magnetic material is secured in this groove and is insulated from the walls thereof, and holds the outer ends of the bars against radial movement and also holds the bars against longitudinal movement. This construction forms an extremely simple and convenient method of mounting the bars. The bars of the two series 2ᵇ and 2ᶜ are arranged in radial alinement with the teeth 2ᵃ.

Similarly there are two rotative series of bars 3ᵇ and 3ᶜ arranged in radial alinement with the teeth 3ᵃ, and alternating with the bars 2ᵇ and 2ᶜ. These two series of rotatable bars are mounted in slots in rings 5ᵃ and 5ᵇ, respectively, integral with a radial extension 5' on the drum 5, in a manner similar to that explained above in reference to the bars 2ᵇ and 2ᶜ.

It is to be noted that the ring portions 8ᵃ and 8ᵇ of the bracket 8 also serve as a means for reducing the flux through the offset portion, in that the flux passing through this path encounters the solid ring portions of low resistance inducing a current therein which chokes the flux back and consequently reduces it, resulting in a greater active flux through the secondary winding.

As illustrated in Figs. 7 and 8, this magnetic structure may be duplicated, there being two spaced laminated stator elements 2 and two spaced laminated rotor elements 3 concentric with the respective stator elements, the periphery of the drum being widened to accommodate the two structures. In this way a balanced structure is obtained in which the torque is evenly applied and the wear on the bearings is equalized.

The power of the apparatus may be still further increased by supplying a leading magnetizing current to the induced circuits, which may be done by inserting condensers 9, 10, and 11 in the respective secondary circuits 4, 4ᵃ, 4ᵇ. These condensers produce an energizing current in the induced circuits which is at its maximum when a pole is opposing an alined section, the current having such direction as to strengthen such pole. By far the more important action, however, of this leading magnetizing current is to materially reduce the opposed flux. This energizing current in the induced windings opposes the pole at the staggered section and thereby weakens it, resulting in a greater active flux and a consequent higher voltage in the secondary windings, and the pole opposing the alined portion can be strengthened by increasing the magnetizing current, which is not possible without the use of the leading magnetizing current to reduce the opposing flux.

To vary the torque and speed of the rotor it is only necessary to vary the resistance of the secondary circuits, which may also be done by variable resistances 12, 13 and 14, in the secondary circuits; or to change the value of the leading magnetizing current in the induced windings by changing the capacity of the condensers.

The device may be operated from a single phase source of supply.

In the embodiment illustrated in Figs. 7 and 8 this is done by closing one of the switches 15 and 16 and leaving the other switch open. It is necessary, however, to bring the rotatable member into motion in the direction in which it is desired to have it rotate and it will thereupon speed up and tend to approach synchronism.

The rotation of the member and consequently the progression of the alined flux path acts on the alternating field produced by the single phase current in such a way as to generate a current in the secondary windings, which coöperates with the alternating field in weakening the flux at one partly alined portion and strengthening it at the other partly alined portion, and producing rotation thereby.

It will be observed that in addition to its operation as an induction motor in the manner above described, the device will also operate as a frequency converter by regulating the speed of rotation of the rotor, the frequency of the generated current in the coil 4 being increased by causing the portion of alinement to rotate in opposition to the field, and being decreased by causing the portion of alinement to rotate in the same direction as the field. If the portion of alinement gets ahead of the field, then the device also operates as an induction generator.

It is obvious that various modifications may be made in the constructions shown in the drawings and above particularly described within the principle and scope of my invention.

I claim:

1. A dynamo electric machine comprising a stator member having a plurality of spaced magnetic conductors, a rotor member having a plurality of spaced magnetic conductors coöperative with those of the stator member to form at least one section having portions in which the conductors of the two members are alined, partly offset in one direction, fully offset, and partly offset in the opposite direction, a winding on one of the members of a span equal to the length of the section, and another winding on one of the members in inductive relation to the first winding.

2. An induction device comprising a stator member having a plurality of spaced magnetic conductors, a rotor member having a plurality of spaced magnetic conductors coöperative with those of the stator member to form at least one section having portions in which the conductors of the two members are alined, partly offset in one direction, fully offset, and partly offset in the opposite direction, a secondary winding on one of the members, a primary winding inductively related to the secondary winding and having its poles of opposite polarity spaced apart substantially the distance between the alined and fully offset portions, and a source of alternating current therefor.

3. An induction device comprising a stator member having a plurality of spaced magnetic conductors, a rotor member having a plurality of spaced magnetic conductors coöperative with those of the stator member to form at least one section having portions in which the conductors of the two members are alined, partly offset in one direction, fully offset, and partly offset in the opposite direction, a secondary winding on one of the members, a polyphrase primary winding on the stator and having its poles of opposite polarity spaced apart substantially the distance between the alined and fully offset portions, and a source of polyphase current therefor.

4. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates, the conductors of the two members coöperating to form at least one circumferential section having successive portions in which the conductors of the two members are respectively alined, partly offset in one direction, fully off-set, and partly offset in the opposite direction, a secondary winding on one of the members spanning an arc equal to that of the section, a primary winding inductively related to the secondary winding and having its poles of opposite polarity spaced apart substantially the distance between the alined and fully offset portions, and a source of alternating current therefor.

5. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates, the conductors of the two members coöperating to form at least one circumferential section having successive portions in which the conductors of the two members are respectively alined, partly offset in one direction, fully offset, and partly offset in the opposite direction, a secondary winding on one of the members, a polyphase primary winding inductively related to the secondary winding and having its poles of opposite polarity spaced apart substantially the distance between the alined and fully offset portions, and a source of polyphase current therefor.

6. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates having greater angular velocity than that of the rotor member, the conductors of the two members coöperating to form at least one circumferential section having successive portions in which the conductors of the two members are respectively alined, partly offset in one direction, fully offset, and partly offset in the opposite direction, a secondary winding on one of the members spanning an arc equal to that of the section, a primary winding inductively related to the secondary winding and having its poles of opposite polarity spaced apart substantially the distance between the alined and fully offset portions, and a source of alternating current therefor.

7. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates having greater angular velocity than that of the rotor member, the conductors of the two members coöperating to form at least one circumferential section having successive portions in which the conductors of the two members are respectively alined, partly offset in one direction, fully offset, and partly offset in the opposite direction, a secondary winding on one of the members, a polyphase primary winding inductively related to the secondary winding and having its poles of opposite polarity spaced apart substantially the distance between the alined and fully offset portions, and a source of polyphase current therefor.

8. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates having greater angular velocity than that of the rotor member, the conductors of the two members coöperating to form at least one circumferential section having successive portions in which the conductors of the two members are respectively alined, partly offset in one direction, fully offset, and partly offset in the opposite direction, a secondary winding on one of the members spanning an arc equal to that of the section, a polyphase primary winding inductively related to the secondary winding and wound to produce a revolving magnetic field acting on the secondary winding and having its poles of opposite polarity spaced apart substantially the distance between the alined and fully offset portions, and a source of polyphase current for the primary winding.

9. An induction device comprising a stator member having a plurality of circularly disposed spaced magnetic conductors arranged in a plurality of sections offset from each other a fraction of the pitch of the magnetic conductors, a rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on one of the members for each section, a polyphase primary winding in inductive relation to the secondary winding and wound to produce a revolving magnetic field acting on the secondary windings and having as many pole pairs as there are sections, the poles of opposite polarity being spaced apart substantially the distance between the alined and fully offset portions of each section, and a source of polyphase current for the primary winding.

10. An induction device comprising a stator member having a plurality of circularly disposed spaced magnetic conductors arranged in a plurality of sections offset from each other a fraction of the pitch of the magnetic conductors, a rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on one of the members for each section, a polyphase primary winding in inductive relation to the secondary winding and wound to produce a revolving magnetic field acting on the secondary windings and having as many pole pairs as there are sections, the poles of opposite polarity being spaced apart substantially the distance between the alined and fully offset portions of each section and the offsetting of the sections of the stator being such that the sum of the negative flux in all the sections equals that of the positive flux, and a source of polyphase current for the primary winding.

11. An induction device comprising an annular external stator member having on its inner periphery a plurality of circularly disposed spaced magnetic conductors arranged in a plurality of circumferential sections offset from each other a fraction of the pitch of the magnetic conductors, an internal rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on the stator member for each section, a polyphase primary winding on the stator member wound to produce a revolving magnetic field acting on the secondary windings and having as many pole pairs as there are sections, the poles of opposite polarity being spaced apart substantially the distance between the alined and fully offset portions of each section, and a source of polyphase current for the primary winding.

12. An induction device comprising a stator member having a plurality of concentric series of circularly arranged spaced magnetic conductors, the conductors of the several series being radially alined, a rotor member having a plurality of concentric series of circularly arranged spaced magnetic conductors, the conductors of the several series being radially alined and coöperative with those of the stator member to complete a rotative flux path as the rotor rotates, the conductors of the two members coöperating to form at least one circumferential section having successive portions in which the conductors of the two members are respectively alined, partly offset in one direction, fully offset, and partly offset in the opposite direction, a secondary winding on one of the members spanning an arc equal to that of the section, a polyphase primary winding in inductive relation to the secondary winding and wound to produce a revolving magnetic field acting on the secondary winding and having its poles of opposite polarity spaced apart substantially the distance between the alined and fully offset portions, and a source of polyphase current for the primary winding.

13. An induction device comprising an annular external stator member having on its inner side a plurality of concentric series of circularly arranged spaced magnetic conductors, the conductors of the several series being radially alined and arranged in a plurality of circumferential sections offset from each other a fraction of the pitch of the magnetic conductors, an internal rotor member having a plurality of concentric series of circularly arranged spaced magnetic conductors, the conductors of the several series being radially alined and coöperative with those of the stator member to form successive portions in each section in which the conductors of the two members are respectively alined, partly offset in one direction, fully offset, and partly offset in the opposite direction, a secondary winding on the stator surrounding each section, a polyphase primary winding on the stator wound to produce a revolving magnetic field acting on the secondary windings and having as many pole pairs as there are sections, the poles of opposite polarity being spaced apart substantially the distance between the alined and and fully offset portions of each section, and a source of polyphase current for the primary winding.

14. An induction device comprising a stator member having a plurality of spaced magnetic conductors, a rotor member having a plurality of spaced magnetic conductors coöperative with those of the stator member to form at least one section having portions in which the conductors of the two members are alined, partly offset in one direction, fully offset, and partly offset in the opposite direction, a secondary winding on one of the members of a span equal to the length of the section, means for producing a leading magnetizing current in the secondary circuit, a primary winding inductively related to the secondary winding, and a source of alternating current therefor.

15. An induction device comprising a stator member having a plurality of circularly disposed spaced magnetic conductors arranged in a plurality of sections offset from each other a fraction of the pitch of the magnetic conductors, a rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on one of the members surrounding each section, means for producing a leading magnetizing current in each secondary circuit, a polyphase primary winding on the stator, and a source of polyphase current therefor.

16. An induction device comprising an annular external stator member having on its inner periphery a plurality of circularly disposed spaced magnetic conductors arranged in a plurality of circumferential sections offset from each other a fraction of the pitch of the magnetic conductors, an internal rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on the stator member surrounding each section, a polyphase primary winding on the stator member wound to produce a revolving magnetic field acting on the secondary windings and having as many pole pairs as there are sections, the poles of opposite polarity being spaced apart substantially the distance between the alined and fully offset portions of each section, a condenser in each secondary circuit, and a source of polyphase current for the primary winding.

17. An induction device comprising a stator member having a plurality of spaced magnetic conductors, a rotor member having a plurality of spaced magnetic conductors coöperative with those of the stator member to form at least one section having portions in which the conductors of the two members are alined, partly offset in one direction, fully offset, and partly offset in the opposite direction, a secondary winding on one of the members of a span equal to the length of the section, a variable resistance in the secondary circuit, a primary winding inductively related to the secondary winding and having its poles of opposite polarity spaced apart substantially the distance between the alined and fully offset portions of each section, and a source of alternating current therefor.

18. An induction device comprising a stator member having a plurality of circularly disposed spaced magnetic conductors arranged in a plurality of sections offset from each other a fraction of the pitch of the magnetic conductors, a rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on one of the members surrounding each section, a variable resistance in each induced circuit, a polyphase primary winding on the stator, and a source of polyphase current therefor.

19. An induction device comprising an annular external stator member having on its inner periphery a plurality of circularly disposed spaced magnetic conductors arranged in a plurality of circumferential sections offset from each other a fraction of the pitch of the magnetic conductors, an internal rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on the stator member for each section, a polyphase primary winding on the stator member wound to produce a revolving magnetic field acting on the secondary windings and having as many pole pairs as there are sections, the poles of opposite polarity being spaced apart substantially the distance between the alined and fully offset portions of each section, a variable resistance in each induced circuit, and a source of polyphase current for the primary winding.

20. An induction device comprising an annular external stator member having on its inner periphery a plurality of circularly disposed spaced magnetic conductors arranged in a plurality of circumferential sections offset from each other a fraction of the pitch of the magnetic conductors, an internal rotor member having a plurality of circularly arranged spaced magnetic conductors coöperative with those of the stator member to form successive portions in each section in which the conductors of the two members are respectively alined, partly offset in one direction, fully offset, and partly offset in the opposite direction, a secondary winding on the stator member for each section, a polyphase primary winding on the stator member wound to produce a revolving magnetic field acting on the secondary windings and having as many pole pairs as there are sections, the poles of opposite polarity being spaced apart substantially the distance between the alined and fully offset portions of each section, a condenser and a variable resistance in each induced circuit, and a source of polyphase current for the primary winding.

21. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates, the conductors of the two members coöperating to form at least one circumferential section having successive portions in which the conductors of the two members are respectively alined, partly offset in one direction, fully offset, and partly offset in the opposite direction, a secondary winding on one of the members, a polyphase primary winding in inductive relation to the secondary winding and wound to produce a revolving magnetic field acting on the secondary winding and having its poles of opposite polarity spaced apart substantially the distance between the alined and fully offset portions, the flux of the pole opposite the alined portion being active in inducing an electromotive force in the secondary circuit and the flux of the pole opposite the fully offset portion being opposed to said active flux, a source of polyphase magnetizing current for the primary winding, and means for reducing the opposed flux.

22. An induction device comprising a stator member having a plurality of circularly arranged spaced magnetic conductors, a rotor member having a plurality of circularly arranged spaced magnetic conductors coöperative with those of the stator member to complete a rotative flux path as the rotor member rotates, the conductors of the two members coöperating to form at least one circumferential section having successive portions in which the conductors of the two members are respectively alined, partly offset in one direction, fully offset, and partly offset in the opposite direction, a secondary winding on one of the members, a polyphase primary winding in inductive relation to the secondary winding and wound to produce a revolving magnetic field acting on the secondary winding and having its poles of opposite polarity spaced apart substantially the distance between the alined and fully offset portions, the flux of the pole opposite the alined portion being active in inducing an electromotive force in the secondary circuit and the flux of the pole opposite the fully offset portion being opposed to said active flux, a source of polyphase magnetizing current for the primary winding, and means for reducing the opposed flux comprising closed circuits interposed in the path of the opposed flux, whereby currents are induced in said closed circuits by the opposed flux operating to counteract the opposed flux.

23. In a dynamo-electric machine, a rotor comprising an annulus provided with longitudinal slots open at one end, a laminated flux conductor disposed in each slot, and annular retaining means on the end of the annulus engaging the ends of the conductors and holding them in their slots.

24. In an inductive apparatus, a flux conducting element comprising a ring of non-magnetic material provided with a series of longitudinal slots open at one end and closed at the other, a flux conductor fitting in each slot and having its inner end bifurcated and fitting over the ring at the closed end of the slot, and annular retaining means at the end of the ring engaging the ends of the conductors and holding them in their slots.

25. In an induction apparatus, a flux conducting element comprising a ring of non-magnetic material provided with a series of longitudinal slots open at one end and closed at the other and with a groove at the edge intersected by the slots, a flux conductor fitting into each slot and having its outer end slotted to conform to the groove in the ring and form a continuous groove therewith, and an annular retaining member secured in the groove and holding the conductors in their slots.

26. In an induction apparatus, a flux conducting element comprising a ring of non-magnetic material provided with a series of longitudinal slots open at one end and closed at the other and with a groove at the edge intersected by the slots, a flux conductor fitting into each slot and having its inner end bifurcated and fitting over the ring at
5 the closed end of the slot and having its outer end slotted to conform to the groove in the ring and form a continuous groove therewith, and an annular retaining member secured in the groove and holding the conductors in their slots.

In witness whereof, I subscribe my signature, in the presence of two witnesses.

ALFONS H. NEULAND.

Witnesses:
 VICTOR D. BORST,
 WALDO M. CHAPIN.